US012726273B2

(12) United States Patent
Menchetti et al.

(10) Patent No.: US 12,726,273 B2
(45) Date of Patent: Sep. 1, 2026

(54) TELECOMMUNICATIONS NETWORK

(71) Applicant: BRITISH TELECOMMUNICATIONS PUBLIC LIMITED COMPANY, London (GB)

(72) Inventors: Marco Menchetti, London (GB); Fraser Burton, London (GB); Liam Bussey, London (GB); Md Asif Iqbal, London (GB); Amelia Winterburn, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 114 days.

(21) Appl. No.: 18/247,946

(22) PCT Filed: Sep. 10, 2021

(86) PCT No.: PCT/EP2021/074943
§ 371 (c)(1),
(2) Date: Apr. 5, 2023

(87) PCT Pub. No.: WO2022/073715
PCT Pub. Date: Apr. 14, 2022

(65) Prior Publication Data

US 2023/0379055 A1 Nov. 23, 2023

(30) Foreign Application Priority Data

Oct. 5, 2020 (GB) ..................................... 2015745
May 4, 2021 (GB) ..................................... 2106349

(51) Int. Cl.
*H04B 10/27* (2013.01)
*H04B 10/50* (2013.01)
*H04B 10/69* (2013.01)

(52) U.S. Cl.
CPC ........... *H04B 10/27* (2013.01); *H04B 10/503* (2013.01); *H04B 10/69* (2013.01); *H04B 2210/006* (2013.01)

(58) Field of Classification Search
CPC ...... H04B 10/27; H04B 10/503; H04B 10/69; H04B 2210/006
See application file for complete search history.

(56) References Cited

U.S. PATENT DOCUMENTS 4,590,597 A 5/1986 Long-Sheng et al.
5,905,586 A 5/1999 Even
(Continued)

FOREIGN PATENT DOCUMENTS

CN 1494778 A 5/2004
CN 101888269 A 11/2010
(Continued)

OTHER PUBLICATIONS

Combined Search and Examination Report under Sections 17 and 18(3) for Great Britain Application No. 2015745.9, mailed on Apr. 6, 2021, 09 pages.
(Continued)

*Primary Examiner* — Pranesh K Barua
(74) *Attorney, Agent, or Firm* — EIP US LLP

(57) ABSTRACT

This disclosure provides a method of operating a central node in a telecommunications network, the telecommunications network including an optical network and a plurality of distributed nodes each configured to use a first optical signal at a first wavelength, the method including producing a first optical signal at a second wavelength; directing the first optical signal into a first path for the first optical signal and a second path for the first optical signal, wherein the first path for the first optical signal is connected to a first optical stabilizer to stabilize the first optical signal produced by the
(Continued)

central node, and the second path for the first optical signal provides the first optical signal to the optical network for distribution to each of the plurality of distributed nodes, wherein the second wavelength has a lower transmission loss than the first wavelength.

26 Claims, 6 Drawing Sheets

(56) References Cited

U.S. PATENT DOCUMENTS 6,233,080 B1 5/2001 Brenner et al.
6,580,513 B2 6/2003 Akahoshi
6,782,017 B1 * 8/2004 Kai ........................ H01S 5/0687 372/18
6,842,587 B1 1/2005 McGhan et al.
8,036,529 B2 10/2011 Kim et al.
8,565,609 B2 10/2013 Wilkinson et al.
11,165,505 B2 11/2021 Gordon et al.
11,218,222 B1 * 1/2022 Perry ................. H04Q 11/0062
12,411,162 B2 9/2025 Burton et al.
2002/0093661 A1 * 7/2002 Akahoshi ............. H04B 10/503 356/484
2002/0145776 A1 10/2002 Chow
2003/0138007 A1 7/2003 Lee et al.
2004/0033021 A1 2/2004 Oguri et al.
2004/0120721 A1 * 6/2004 Wang .................... G01J 9/0246 398/195
2008/0138073 A1 * 6/2008 Kim .................... H04J 14/0226 398/79
2009/0060510 A1 * 3/2009 Baca ................... H04J 14/0252 398/72
2010/0196010 A1 * 8/2010 Miura .................. H04B 10/272 398/72
2011/0234435 A1 9/2011 Agarawal et al.
2012/0177373 A1 * 7/2012 Choi ................... H04J 14/0246 398/72
2014/0376907 A1 12/2014 Inwoong et al.
2017/0288773 A1 10/2017 Stiscia et al.
2019/0109666 A1 4/2019 Kato et al.
2020/0292606 A1 9/2020 Holloway et al.
2022/0196719 A1 6/2022 Walker et al.
2026/0012259 A1 * 1/2026 Menchetti ........ H04B 10/25759

FOREIGN PATENT DOCUMENTS

CN 110401492 A 11/2019
CN 110752883 A 2/2020
CN 108809341 B 4/2020
CN 110401492 B 8/2020
CN 110752883 B 8/2021
EP 0911928 A2 4/1999
EP 0331303 B1 5/2002
EP 0911928 B1 1/2004
GB 2570109 A 7/2019
GB 2599468 A 4/2022
JP 2002261697 A * 9/2002
JP 2006073755 A 3/2006
JP 20190041364 A 11/2019
WO WO-2011014251 A1 * 2/2011 ........ H04J 14/02764
WO WO-2021078438 A1 4/2021
WO 2024037792 A1 2/2024

OTHER PUBLICATIONS

Combined Search and Examination Report under Sections 17 and 18(3) for Great Britain Application No. 2015745.9, mailed on Jul. 19, 2021, 08 pages.
Combined Search and Examination Report under Sections 17 and 18(3) for Great Britain Application No. 2106349.0, mailed on Nov. 4, 2021, 10 pages.
Combined Search and Examination Report under Sections 17 and 18(3) for Great Britain Application No. 2211997.8, mailed on Feb. 3, 2023, 05 pages.
Extended European Search Report for Application No. 22190757.9, mailed on Jan. 31, 2023, 10 pages.
Gordon J.A., et al., "Weak Electric-Field Detection With Sub-1 Hz Resolution at Radio Frequencies Using a Rydberg Atom-Based Mixer," AIP Advances, Apr. 25, 2019, vol. 9, No. 4, 6 pages.
International Preliminary Report on Patentability for Application No. PCT/EP2021/074943, mailed Jan. 16, 2023, 15 pages.
International Search Report and Written Opinion for International Application No. PCT/EP2021/074943, mailed Dec. 23, 2021, 12 pages.
Langbecker M., et al., "Rydberg Excitation Of Cold Atoms Inside A Hollow Core Fiber," arxiv.org, Cornell University Library, Oct. 4, 2017, arXiv:1706.07666v2 [quant-ph], 6 pages.
Song Z., et al., "Rydberg-Atom-Based Digital Communication Using a Continuously Tunable Radio-Frequency Carrier," Optics Express, Mar. 18, 2019, vol. 27, No. 6, pp. 8848-8857.
Thaicharoen N., et al., "Electromagnetically-Induced Transparency, Absorption, and Microwave Field Sensing in a Rb Vapor Cell With a Three-Color All-Infrared Laser System," arXiv:1905.09925v1, [physics.atom-ph], May 23, 2019, 9 pages.
Written Opinion of the International Preliminary Examining Authority for PCT/EP2021/074943, mailed on Sep. 26, 2022, 06 pages.
You S.H., et al., "Microwave-Field Sensing via Electromagnetically Induced Absorption of Rb Irradiated by Three-Color Infrared Lasers," Optics Express, May 9, 2022, vol. 30, No. 10, pp. 16619-16629.
International Search Report and Written Opinion received for PCT Patent Application No. PCT/EP2023/069158, mailed on Oct. 11, 2023, 14 pgs.
Notice of Allowance received for Great Britain Patent Application No. 2211997.8, mailed on Jul. 3, 2024, 4 pgs.
Office Action received for Great Britain Patent Application No. 2211997.8, mailed on Apr. 8, 2024, 4 pgs.
Search and Examination Report received for Great Britain Patent Application No. 2106349.0, mailed on Apr. 13, 2023, 7 pages.
Holloway , et al., "A Multiple-Band Rydberg-Atom Based Receiver/Antenna: AM/FM Stereo Reception", National Institute of Standards and Technology (NIST), Mar. 5, 2019, 10 pages.
Simons , et al., "Using Frequency Detuning to Improve the Sensitivity of Electric Field Measurements Via Electromagnetically Induced Transparency and Autler-Townes Splitting in Rydberg Atoms", Applied Physics Letters, vol. 108, No. 174101, 2016, pp. 1-5.
Chinese Office Action for CN 202180067952.3 dated Mar. 14, 2025, 8 pgs.

* cited by examiner

TELECOMMUNICATIONS NETWORK

PRIORITY CLAIM

The present application is a National Phase entry of PCT Application No. PCT/EP2021/074943, filed Sep. 10, 2021, which claims priority from GB Patent Application No. 2015745.9, filed Oct. 5, 2020 and GB Patent Application No. 2106349.0, filed May 4, 2021, each of which is hereby fully incorporated herein by reference.

TECHNICAL FIELD

The present disclosure relates to a telecommunications network including an optical network.

BACKGROUND

Many technologies require stable laser signals, such as the emerging set of Rydberg-atom based technologies including atomic radio detectors, atomic clocks and atomic gravimeters. These Rydberg-atom based technologies often utilize a laser signal to excite an electron of an atomic medium, typically comprising Rubidium, Cesium or Strontium atoms, to a Rydberg state. For example, in an atomic radio detector based on an atomic medium of Rubidium-85 atoms, a first laser signal at 780 nm may be used to excite electrons from the Rubidium atom's ground state to a first excited state, and a second laser signal may then be used to excite electrons from this first excited state to a Rydberg state. For long-term operation, these laser signals should be stabilized at these wavelengths. In an example, the stability of the laser signal required to transition an electron from the ground state of the Rubidium-85 atomto the first excited state (which has a linewidth of around 6 MHz) should be less than 1 MHz (i.e. it should not deviate by more than 1 MHz) over the time frame of operation to ensure efficient operation. This may be achieved using a saturation absorption spectroscopy technique, but this requires expensive and dedicated equipment. Accordingly, mass deployment of devices containing a Rydberg-atom based technology (such as in a wireless telecommunications network in which each wireless device includes a Rydberg-atom based radio frequency detector) may be prohibitively expensive as each device requires locally applied saturation absorption spectroscopy to stabilize the laser signal.

SUMMARY

According to a first aspect of the disclosure, there is provided a method of operating a central node in a telecommunications network, the telecommunications network including an optical network and a plurality of distributed nodes each configured to use a first optical signal at a first wavelength, the method comprising: producing a first optical signal at a second wavelength; directing the first optical signal into a first path for the first optical signal and a second path for the first optical signal, wherein the first path for the first optical signal is connected to a first optical stabilizer to stabilize the first optical signal produced by the central node, and the second path for the first optical signal provides the first optical signal to the optical network for distribution to each of the plurality of distributed nodes, wherein the second wavelength has a lower transmission loss than the first wavelength.

The first path for the first optical signal may include a first wavelength converter to convert the first optical signal from the second wavelength to the first wavelength before stabilization by the optical stabilizer.

The second wavelength may be in a range from 1260 nm to 1625 nm.

Each of the plurality of distributed nodes may be configured to use a second optical signal at a third wavelength, and the method may further comprise: producing a second optical signal at a fourth wavelength; directing the second optical signal into a first path for the second optical signal and a second path for the second optical signal, wherein the first path for the second optical signal is connected to a second optical stabilizer to stabilize the second optical signal produced by the central node, and the second path for the second optical signal provides the second optical signal to the optical network for distribution to each of the plurality of distributed nodes, wherein the fourth wavelength has a lower transmission loss than the third wavelength.

The first path for the second optical signal may include a second wavelength converter to convert the second optical signal from the fourth wavelength to the third wavelength before stabilization by the second optical stabilizer.

The fourth wavelength may be in a range from 1260 nm to 1625 nm.

The second wavelength converter may convert the second optical signal from the fourth wavelength to the third wavelength by mixing the second optical signal at the fourth wavelength with the first optical signal at the first wavelength following conversion of the first optical signal by the first wavelength converter.

Each of the plurality of distributed nodes may utilize the first optical signal at the first wavelength to excite an electron of a Rydberg-atom from a first state to a second state.

Each of the plurality of distributed nodes may utilize the second optical signal at the third wavelength to excite an electron of a Rydberg-atom from the second state to a third state.

The Rydberg atom may be part of a Rydberg-atom based Radio Frequency, RF, receiver.

The optical network may distribute the first optical signal on a hollow core fiber.

The optical network may distribute the second optical signal on a hollow core fiber.

According to a second aspect of the disclosure, there is provided a computer program comprising instructions which, when the program is executed by a computer, cause the computer to carry out the first aspect of the disclosure. The computer program may be stored on a computer readable carrier medium.

According to a third aspect of the disclosure, there is provided a node for a telecommunications network, the telecommunications network including an optical network and a plurality of distributed nodes each configured to use a first optical signal at a first wavelength, the node comprising: a first optical source configured to produce a first optical signal at a second wavelength, wherein the second wavelength has a lower transmission loss than the first wavelength; a first optical stabilizer configured to stabilize the first optical signal; a communications interface connectable to an optical network; and a first splitting unit configured to direct the first optical signal into a first path for the first optical signal and second path for the first optical signal, wherein the first path for the first optical signal is connected to the first optical stabilizer and the second path for the first optical signal is connected to the communications interface so as to provide the first optical signal to the optical network for distribution to each of the plurality of distributed nodes.

The node may be part of a telecommunications network, the telecommunications network further comprising an optical network and a plurality of distributed nodes.

BRIEF DESCRIPTION OF THE FIGURES

In order that the present disclosure may be better understood, embodiments thereof will now be described, by way of example only, with reference to the accompanying drawings in which.

DETAILED DESCRIPTION

A first embodiment of a telecommunications network will now be described with reference to FIG. 1. This embodiment is based on a cellular telecommunications network including a core network node 10 and a plurality of base stations 20, 30, 40, 50. The core network node 10 is connected to each base station of the plurality of base stations by an optical distribution network 60.

Figure 1:
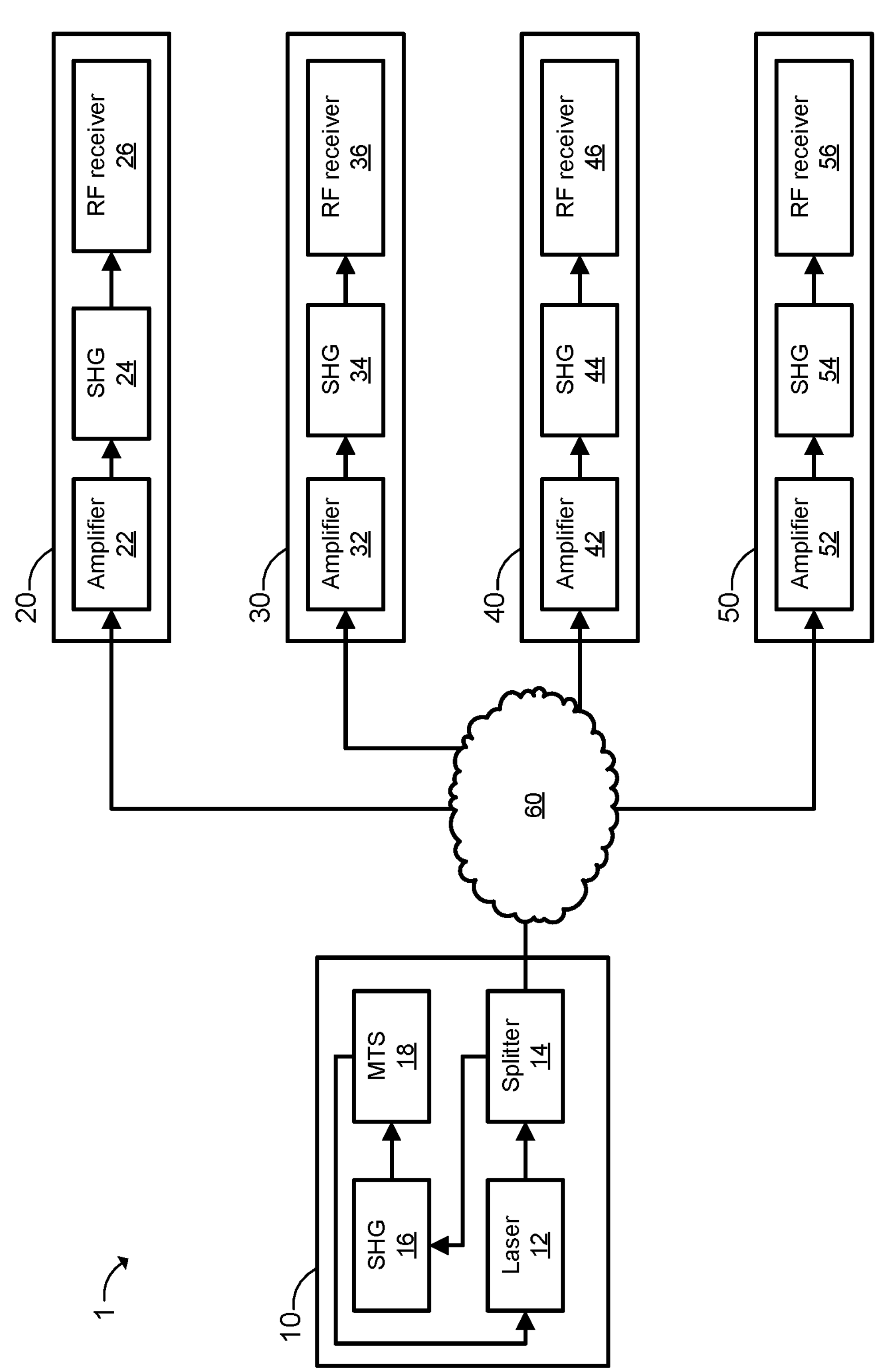
FIG. 1 is a schematic diagram of a cellular telecommunications network of a first embodiment of the present disclosure.

As shown in FIG. 1, the core network node 10 includes a master laser 12 configured to generate a laser signal at 1560 nm. The core network 10 further includes a splitter 14, a wavelength converter 16 and a laser stabilizer 18. In this embodiment, the wavelength converter 16 is based on a Second Harmonic Generation (SHG) Periodically Poled Nonlinear (PPLN) optical waveguide in order to halve the wavelength of the 1560 nm laser signal of the master laser 12 to 780 nm. An example of this technique is described in European Patent number 0331303B1. Furthermore, in this embodiment, the laser stabilizer 18 is based on Modulation Transfer Spectroscopy (MTS), which stabilizes the 780 nm laser signal following the conversion by the wavelength converter to the required degree of stabilization. An example of this technique is described in U.S. Pat. No. 4,590,597.

Figure 2:
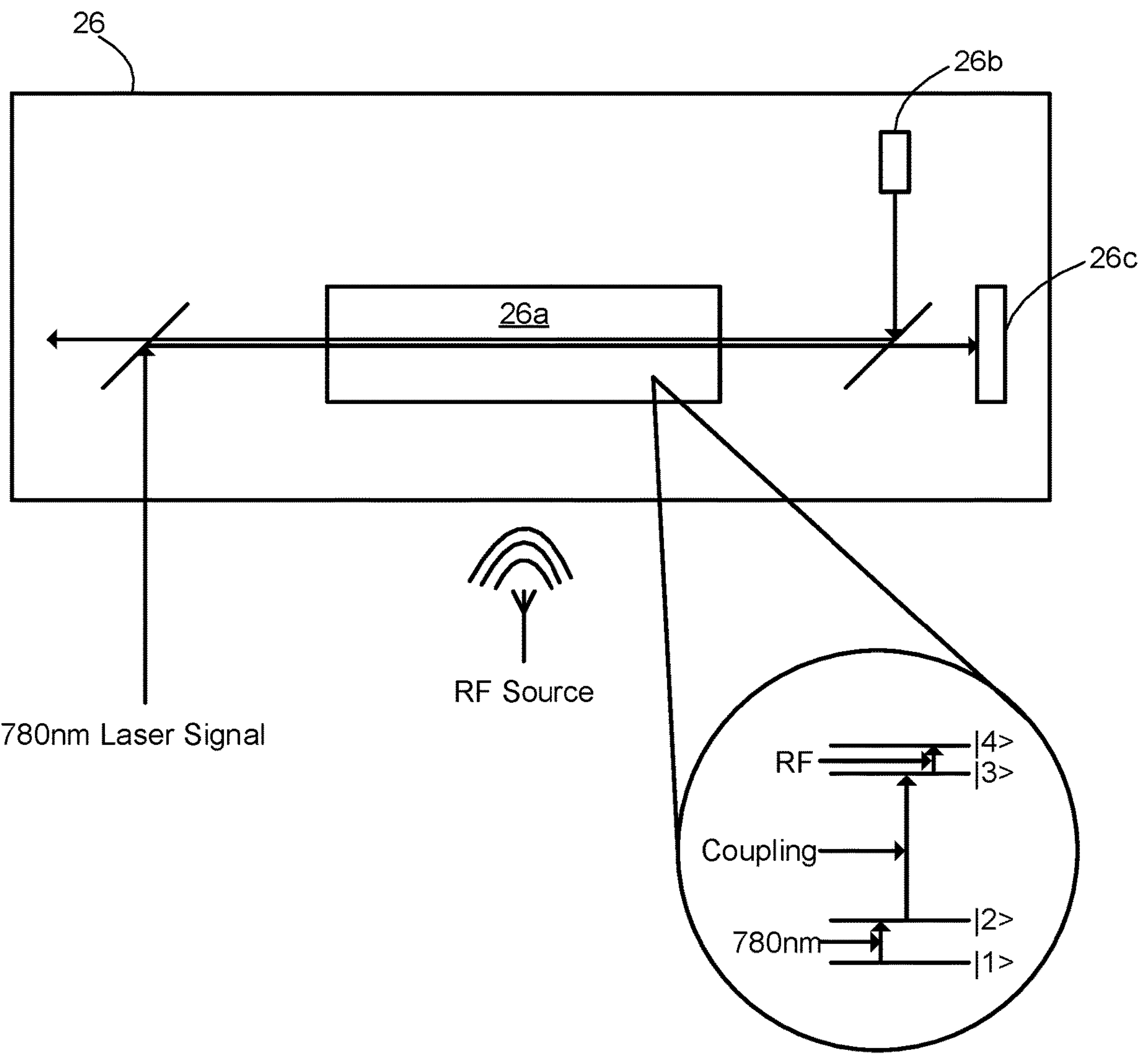
FIG. 2 is a schematic diagram of a Rydberg-atom based radio frequency receiver of a base station of the network of FIG. 1.

FIG. 1 also illustrates each base station of the plurality of base stations 20, 30, 40, 50 as including an amplifier 22, 32, 42, 52, a wavelength converter 24, 34, 36, 46, and a Rydberg-atom based Radio Frequency (RF) receiver 26, 36, 46, 56. The Rydberg-atom based RF receiver 26 of a first base station 20 of the plurality of base stations 20, 30, 40, 50 is shown in FIG. 2 and operates as follows (and the skilled person will realizethat the Rydberg-atom based RF receivers of the other base stations of the plurality of base stations may operate in the same manner). An atomic medium **26*a*** is provided which, in this example, is a glass cell filled with a low density vapor of alkali atoms (such as Rubidium-85). Each Rubidium-85 atom has a number of electron states, including the ground state (|1>) and a plurality of excited states. The outer electron of the Rubidium-85 atom may be excited (e.g. by absorbing a photon of a particular wavelength) from the ground state (|1>) to an excited state. The electron may then decay from the excited state to a lower excited state (that is, an excited state at a lower energy level) or to the ground state (|1>). However, some of these transitions are not allowed as they are dipole forbidden.

In the RF receiver, the laser signal (initially received from the core networking node 10) is passed through the atomic medium **26*a* and elevates the Rubidium-85 atom's outer electron from its ground state (|1>) to a first excited state (|2>). This elevation occurs due to the 780 nm wavelength of the laser signal corresponding to the energy required to elevate the Rubidium-85 atom's outer electron from the ground state (|1>) to the first excited state (|2>). In this context, the laser signal may be referred to as a "probe" signal. A second "coupling" laser signal (generated by a coupling laser 26*b*) is also passed through the atomic medium 26*a* in an opposing direction at a relatively large power level (compared to the probe laser) and at a second wavelength which corresponds to the energy required to elevate the Rubidium-85 atom's outer electron from the first excited state (|2>) to a Rydberg state (|3>). The transition from the Rydberg state (|3>) to the ground state (|1>) is forbidden so that the ground state (|1>) becomes depopulated and so fewer atoms can absorb the 780 nm laser signal. Accordingly, the atomic medium 26*a* becomes more transparent to the 780 nm laser signal such that there is an increase in transmission of the 780 nm laser signal through the atomic medium 26*a*, which is observable at an optical detector 26*c***. This phenomenon is known as Electromagnetically Induced Transparency (EIT) and the received signal is known as the EIT signal. Specifically, the above description is of a ladder scheme EIT effect, but the skilled person would understand that the EIT effect may be realizedthrough alternative electron transitions, such as the Vee and Lambda schemes.

Once the atomic medium **26*a* has become transparent to the 780 nm, then a further physical effect can be exploited to detect RF electric fields. As the Rubidium-85 atom's outer electron is much further away from the atomic nucleus when in the Rydberg state compared to the ground state, a large dipole moment is created and it becomes responsive to incident RF electric fields. An incident RF electric field may cause a further transition of an electron from the Rydberg state to another Rydberg state. If the transition from the other Rydberg state to the ground state is not forbidden, then electrons may subsequently drop to the ground state so that the atomic medium 26*a*** becomes less transparent to the 780 nm laser signal, causing a drop in amplitude of the EIT signal. This drop in amplitude of the EIT signal is directly proportional to the incident RF electric field's amplitude, thus creating a Rydberg-atom based AM RF receiver. A more detailed explanation of this effect can be found in the article, "A Multiple-Band Rydberg-Atom Based Receiver/Antenna: AM/FM Stereo Reception", Holloway et al., National Institute of Standards and Technology).

Furthermore, a Rydberg-atom based FM RF receiver works in a similar manner. That is, when the RF electric field changes (or "detunes") from its resonant RF transition frequency, the EIT signal splits into two non-symmetrical peaks. The separation of the two peaks increases with RF detuning. By locking the 780 nm laser signal and coupling laser to particular frequencies, then the optical detector output is directly correlated to the FM RF electric field. A more detailed explanation of this effect can also be found in article, "A Multiple-Band Rydberg-Atom Based Receiver/Antenna: AM/FM Stereo Reception", Holloway et al., National Institute of Standards and Technology) and in article, "Using frequency detuning to improve the sensitivity of electric field measurements via electromagnetically induced transparency and Autler-Townes splitting in Rydberg atoms" Appl. Phys. Lett. 108, 174101 (2016), Matt T. Simons.

Rydberg RF receivers may also be used to detect phase modulated RF fields, such as those of Binary Phase-Shift Keying (BPSK), Quadrature Phase-Shift Keying (QPSK), and Quadrature Amplitude Modulation (QAM) signals (used in many wireless and cellular communications protocols). In these modulation schemes, data is transmitted by modulating the phase of a carrier. To detect the carrier's phase, a reference RF field being on-resonance with the transition to the Rydberg state is applied to the atomic medium, which acts as a local oscillator. The difference frequency, or "intermediate frequency", is detected and the phase of the intermediate frequency signal corresponds directly to the relative phase between the local oscillator and the incident RF electric field.

Regardless of the modulation scheme used (amplitude, frequency or phase), the Rydberg atom based RF detector may be configured to detect RF fields of a specific frequency by selecting a particular second wavelength of the coupling laser 26*b* so that the electrons of the atomic medium 26*a* are elevated to a particular Rydberg state. This Rydberg state is selected so that photons at the specific frequency to be detected will elevate electrons from this Rydberg state to its adjacent Rydberg state, thus creating a detectable change in the EIT signal that may be observed at the optical detector 26*c*.

Figure 3:
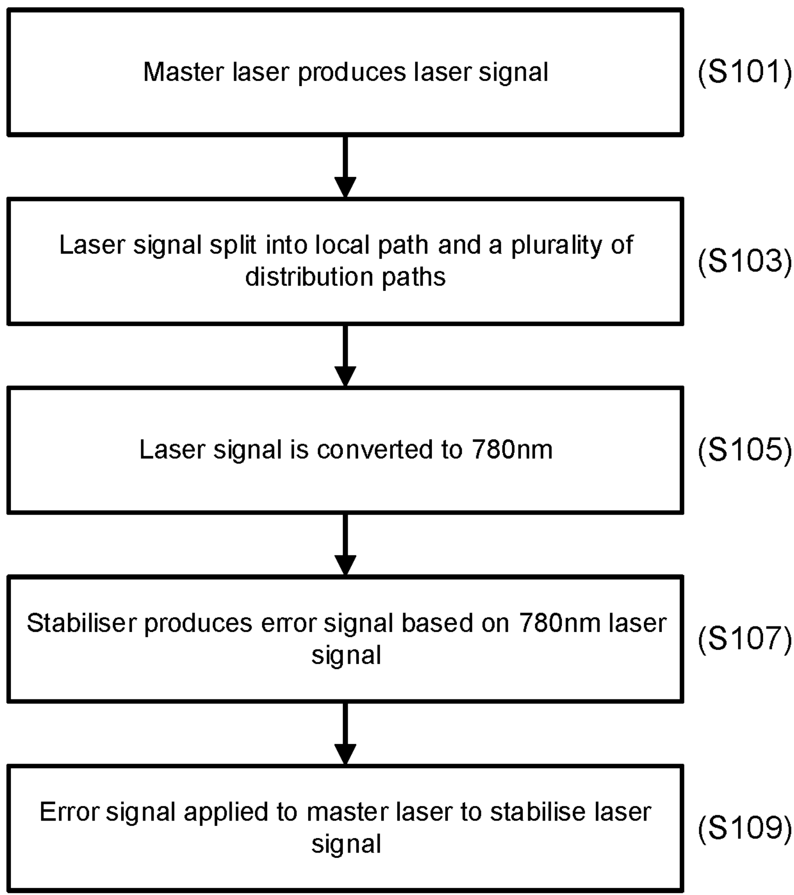
FIG. 3 is a flow diagram of a first embodiment of a method of the present disclosure, illustrating a first process implemented by a core networking node of the network of FIG. 1.
Figure 4:
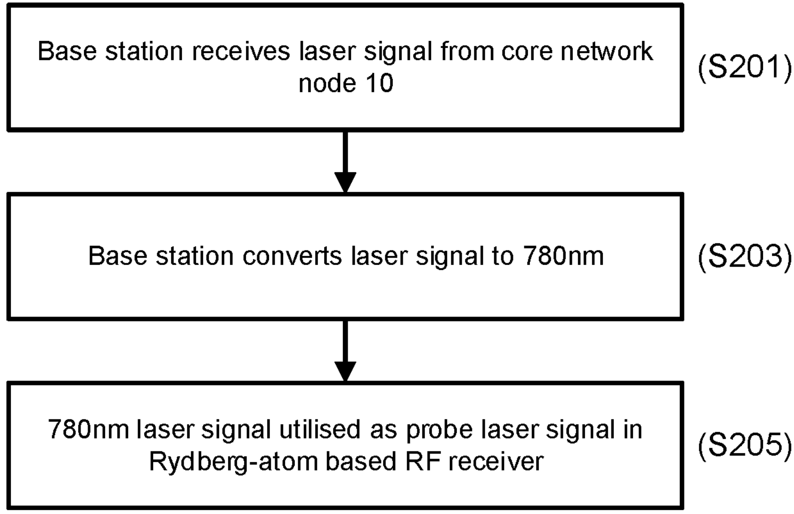
FIG. 4 is a flow diagram of the first embodiment of the method of the present disclosure, illustrating a second process implemented by each base station of the network of FIG. 1.

A first embodiment of a method of the present disclosure will now be described with reference to the cellular telecommunications network of FIG. 1 and the flow diagrams of FIGS. 3 and 4. In S101, as shown in FIG. 3, the master laser 12 produces a laser signal at 1560 nm. In S103, this laser signal is transmitted to the splitter 14, which splits the laser signal into a local path and a plurality of distribution paths. The local path directs the 1560 nm laser signal towards the core network node's wavelength converter 16, whilst each distribution path directs the 1560 nm laser signal towards a particular base station of the plurality of base stations 20, 30, 40, 50. Following the local path, in S105, the 1560 nm laser signal is converted to a 780 nm laser signal by the wavelength converter 16, and is then directed to the laser stabilizer 18 which, in S107, generates an error signal. This error signal is fed back to the master laser 12 so as to stabilize its laser signal in S109.

Following the distribution paths, the 1560 nm laser signal is distributed to each base station of the plurality of base stations 20, 30, 40, 50 by a particular distribution path in the optical network 60. In S201, as shown in FIG. 4, each base station of the plurality of base stations 20, 30, 40, 50 receives the 1560 nm laser signal from the core networking node 10 at the amplifier 22, 32, 42, 52, which amplifies the 1560 nm signal to compensate for any power reduction of the wavelength converter 24, 34, 44, 54. In S203, the amplified 1560 nm laser signal is directed to the wavelength converter 24, 34, 44, 54 which converts the 1560 nm laser signal to a 780 nm laser signal. In S205, the 780 nm laser signal is directed towards the Rydberg-atom based RF receiver 26, 36, 46, 56 and used to excite electrons of the atomic medium of Rubidium-85 atoms from a ground state to a first excited state (as described above).

The above embodiment enables distribution of a stable laser signal from a single node to a plurality of devices that each utilize a Rydberg-atom based RF receiver. Conventionally, each device that utilized a Rydberg-atom based RF receiver would require its own stabilizer. However, by distributing this laser signal, and implementing the stabilizer in the core networking node prior to distribution, the number of stabilizers required in the network is reduced from N (where N is a count of devices that utilize a Rydberg-atom based RF receiver) to 1.

Furthermore, as the wavelength converter of each base station 20, 30, 40, 50 applies the same conversion (i.e. to output a laser signal of the same wavelength) to the wavelength converter 16 of the core networking node, the laser signals as used in both the laser stabilizer 18 of the core networking node and the Rydberg-atom based RF receivers 26, 36, 46, 56 of the plurality of base stations 20, 30, 40, 50 have the same wavelength. This ensures that the error signal generated by the laser stabilizer 18 stabilizes the master laser 12 to the accuracy required for operation of the Rydberg-atom based RF receivers in each base station of the plurality of base stations 20, 30, 40, 50. However, this is non-essential as the stabilization unit may be based on alternative technologies that do not require the wavelength conversion, such as a frequency comb or stable cavity.

The above embodiment also distributes the stabilized laser signal at a wavelength of 1560 nm, rather than at the 780 nm wavelength required for the Rydberg-atom based RF receiver, as the laser signal will suffer far less attenuation as it is transmitted between the core networking node 10 and each base station of the plurality of base stations 20, 30, 40, 50 at this wavelength (<0.3 db/km, compared to ~4 db/km for a laser signal at 780 nm). However, the skilled person will understand that it is non-essential that the stabilized laser signal is distributed at 1560 nm. That is, the core networking node 10 may transmit the laser signal at any wavelength, but one having a lower transmission loss compared to a laser signal having the wavelength required by the Rydberg-atom based RF receiver. The distributed laser signal may therefore have a wavelength between 1260 nm to 1625 nm, or one of the Original (O)-band (1260-1360 nm), Extended (E)-band (1360-1460 nm), Short (S)-band (1460-1530 nm), Conventional (C)-band (1530-1565 nm) or Long (L)-band (1565-1625 nm). Distributing the laser signal at 1560 nm to a plurality of base stations 20, 30, 40, 50 utilizing a Rydberg-atom based RF receiver requiring a 780 nm laser signal is beneficial due to the relative ease of the wavelength conversion between 780 nm and 1560 nm.

Figure 5:
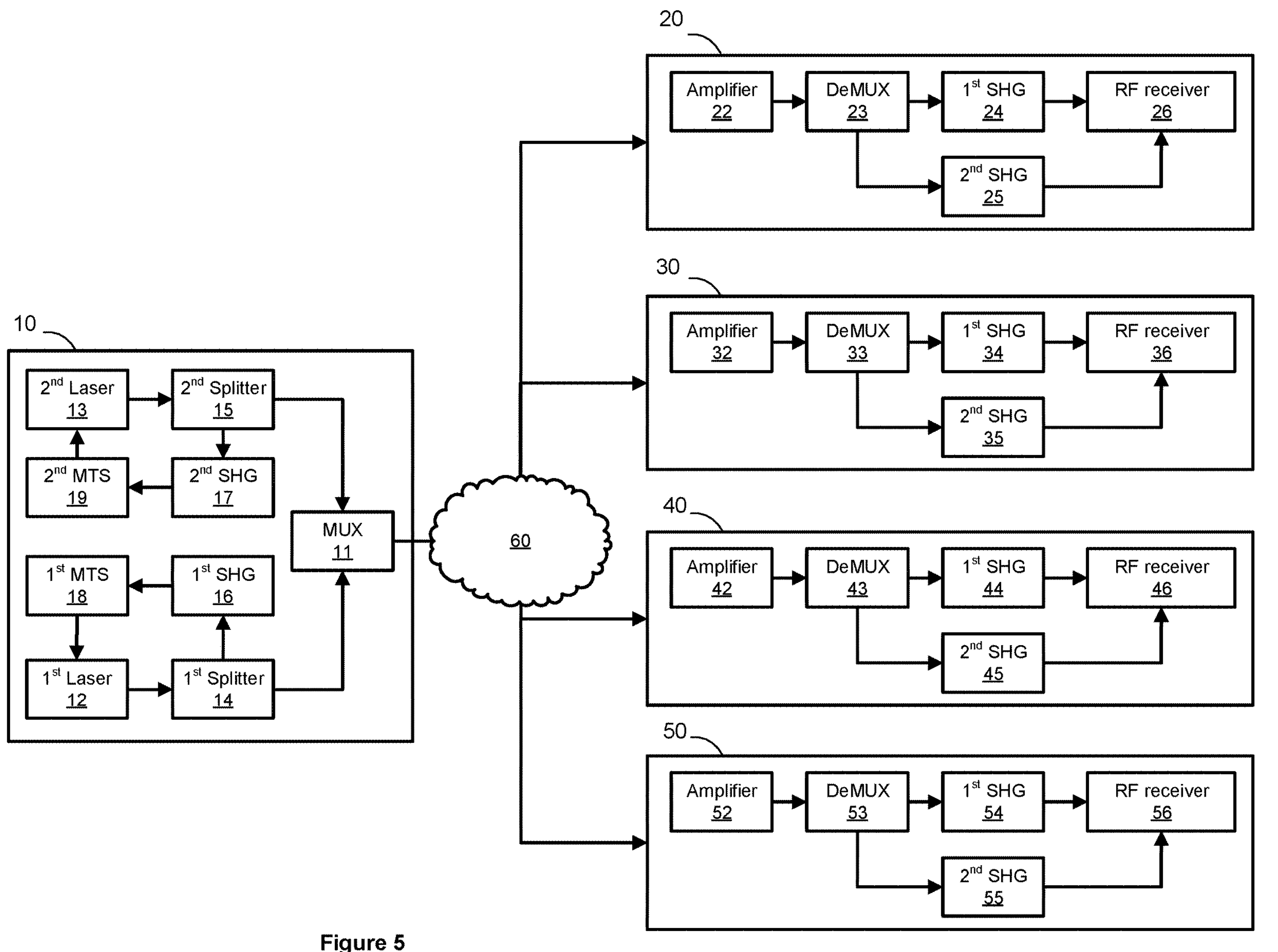
FIG. 5 is a schematic diagram of a cellular telecommunications network of a second embodiment of the present disclosure.

In the above first embodiment, the RF receiver of each base station includes a coupling laser for producing a coupling signal. However, the telecommunications network may also be adapted to produce a signal in the core networking node that is used as a coupling signal in the RF receiver of each base station (alternatively or in addition to the signal that is used as a probe signal in each RF receiver). A second embodiment, illustrating the central networking node 10 producing both a probe signal and a coupling signal, will now be described with reference to FIG. 5 (in which the same reference numerals as used in the first embodiment are used for like-for-like components). The master laser 12 (identified as the first master laser 12 in this second embodiment), splitter 14 (identified as the first splitter 14 in this second embodiment), SHG 16 (identified as the first SHG 16 in this second embodiment) and MTS 18 (identified as the first MTS 18 in this second embodiment) operate in the same manner as the first embodiment. In this second embodiment, the core networking node 10 includes a second master laser node 13, a second splitter 15, a second SHG 17 and a second MTS 19. The second master laser 13 produces a laser signal at 960 nm and the second splitter 15, second SHG 17 and second MTS 19 operate to split and stabilize the 960 nm signal (in the same way as the first splitter 14, first SHG 16 and first MTS 18 operate to split and stabilize the 1560 nm signal). The core networking node 10 also includes a multiplexer 11 which multiplexes the 1560 nm and 960 nm signals for distribution by the optical network 60 to each of the plurality of base stations 20, 30, 40, 50. At each base station, the 1560 nm and 960 nm signals are amplified (by amplifiers 22, 32, 42, 52) and demultiplexed (by demultiplexers 23, 33, 43, 53). The 1560 nm signal is directed to the $1^{st}$ SHG 24, 34, 44, 54 to be wavelength converted to 780 nm, and the 960 nm signal is directed to the $2^{nd}$ SHG 25, 35, 45, 55 to be wavelength converted to 480 nm. The 780 nm signal is then used as a probe signal in each RF receiver 26, 36, 46, 56, and the 480 nm signal is then used as a coupling signal in each RF receiver 26, 36, 46, 56.

This second embodiment therefore has the advantage that both the probe signal and coupling signal are centrally produced, stabilized and distributed to each base station 20, 30, 40, 50. As the 960 nm signal would be more heavily attenuated than the 1560 nm signal during its passage of each distribution path of the optical network 60, then one or more amplifiers (such as a Neodymium Doped Fiber Amplifier (NDFA)) may be provided on each distribution path to amplify the 960 nm signal.

Figure 6:
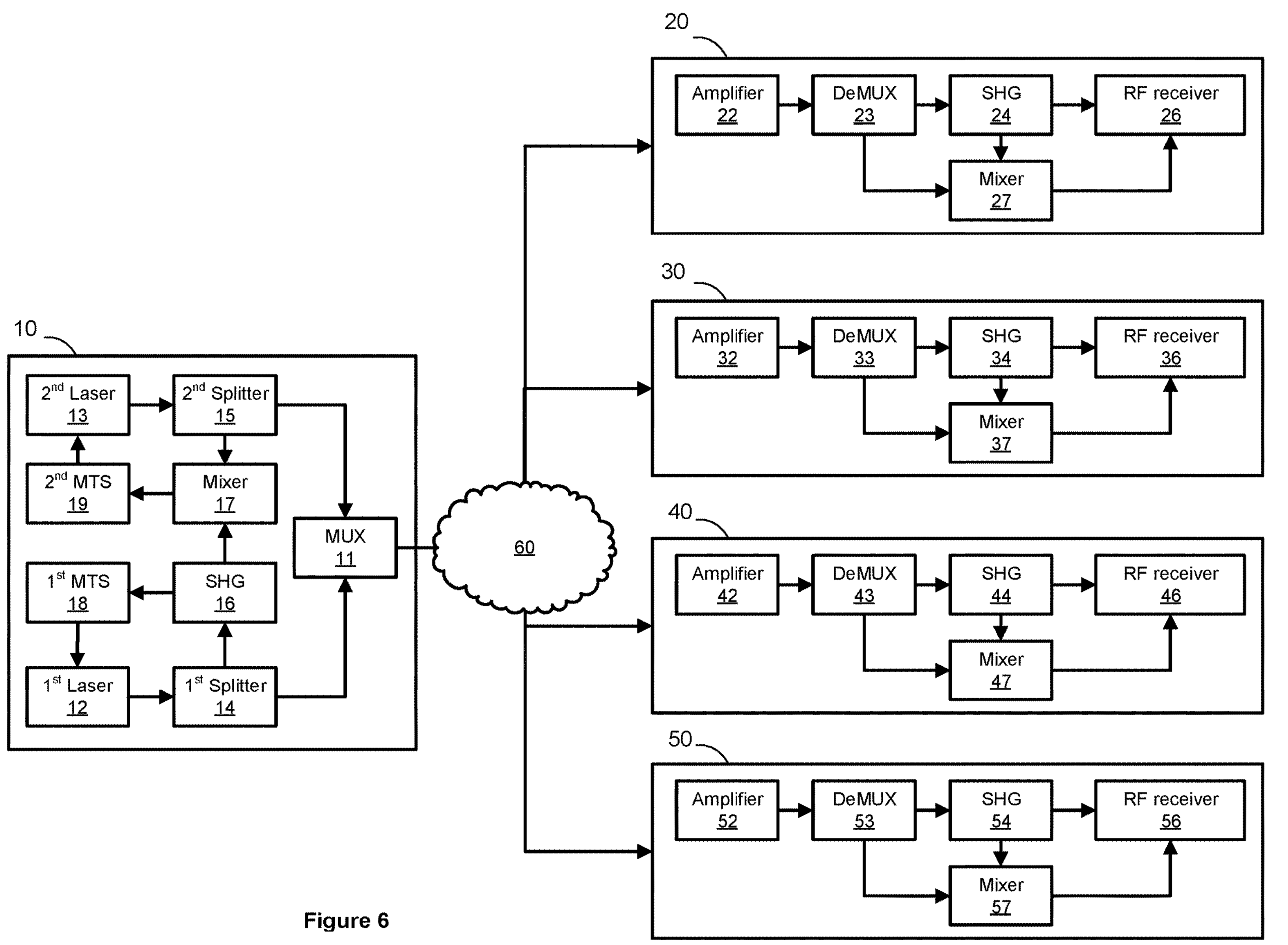
FIG. 6 is a schematic diagram of a cellular telecommunications network of a third embodiment of the present disclosure.

A third embodiment will now be described with reference to FIG. 6. FIG. 6 illustrates another telecommunications network in which the probe and coupling signals are centrally produced. However, in this third embodiment, the second master laser 13 produces a 1248 nm signal and the second SHG is replaced with a mixer. The 1248 nm signal is split by splitter 15 into a first path and a second path. The first path directs the 1248 nm signal to the mixer, where it is mixed with the 780 nm signal from SHG 16, thus producing a 480 nm signal. This 480 nm signal is then passed to the second MTS 19 to stabilize the 1248 nm signal. The second path directs the 1248 nm signal to the multiplexer 11 which multiplexes the 1560 nm signal and 1248 nm signal for distribution by the optical network 60 to each of the plurality of base stations 20, 30, 40, 50. At each base station 20, 30, 40, 50, the 1560 nm and 1248 nm signals are amplified (by amplifiers 22, 32, 42, 52) and demultiplexed (by demultiplexers 23, 33, 43, 53). The 1560 nm is passed to an SHG to be wavelength converted to 780 nm and is then passed to both the RF receiver 26, 36, 46, 56 (to act as a probe signal) and to a mixer 27, 37, 47, 57 where it is mixed with the demultiplexed 1248 nm signal to produce a 480 nm signal. The 480 nm signal is then also passed to the RF receiver 26, 36, 46, 56 to act as a coupling signal. This third embodiment has an advantage over the second embodiment in that the 1248 nm signal suffers less attenuation than the 960 nm signal, reducing the need for amplifiers on the distribution paths.

In the above embodiments, the optical network 60 may use an optical fiber such as single-mode fiber or hollow-core fiber. Hollow-core fiber may be designed such that attenuation of the signals (e.g. at 1560 nm, 1248 nm, and/or 960 nm) is less than what would be experienced with use of a single-mode fiber. This may also reduce the need for amplifiers on the distribution paths and/or at each distributed node.

In the second and third embodiments above, a multiplexer/demultiplexer is used to distribute multiple signals. However, this is non-essential and each signal may be distributed using a dedicated optical fiber.

The skilled person will understand that it is non-essential that the present disclosure is realized in an optical network that is part of a cellular telecommunications network. That is, the present disclosure may be realized in any form of telecommunications network in which a laser signal is distributed from a central node to a plurality of distributed nodes via an optical network.

Furthermore, the skilled person will understand that it is non-essential that each distributed node of the plurality of distributed nodes implement a Rydberg-atom based RF receiver. That is, the benefit of distributing a stable laser signal may be realized in any telecommunications network in which a plurality of distributed nodes each require a stable laser signal. The plurality of distributed nodes may each implement an alternative form of Rydberg-atom based technology or any other technology requiring a stable laser signal. Furthermore, the skilled person will understand that it is non-essential for the stable laser to be used to transition an electron from the ground state to a first excited state (i.e. a probe laser signal), and may be used for any other electron transition. Furthermore, the central node may provide a plurality of stable laser signals to each of the plurality of distributed nodes using the above technique, such that a first stable laser signal may be used as a probe laser signal and a second stable laser signal may be used as a coupling laser signal.

The skilled person will also understand that the use of a splitter in the core networking node 10 is non-essential, as any other device capable of splitting (that is, routing or directing) the laser signal into a local path and a plurality of distribution paths may be used instead. This may include, for example, an optical coupler. Furthermore, the skilled person will understand that it is non-essential that a laser produces each optical signal in the embodiments above. That is, another optical transmitter (or coherent optical transmitter), such as a Light Emitting Diode, LED, may be used instead.

The skilled person will understand that any combination of features is possible within the scope of the disclosure, as claimed.

The invention claimed is:

1. A method in a telecommunications network, the telecommunications network including a central node, an optical network and a plurality of distributed nodes, the method comprising:

at the central node, producing a first optical signal at a first wavelength;

at the central node, directing the first optical signal into a first path for the first optical signal and a second path for the first optical signal, wherein the first path for the first optical signal is connected to a first optical stabilizer to stabilize the first optical signal produced by the central node, and the second path for the first optical signal provides the stabilized first optical signal to the optical network for distribution to each of the plurality of distributed nodes;

at each of the plurality of distributed nodes, converting the stabilized first optical signal from the first wavelength to a second wavelength; and at each of the plurality of distributed nodes, using the stabilized first optical signal at the second wavelength, wherein the first wavelength has a lower transmission loss than the second wavelength.

2. The method of claim 1, wherein the first path for the first optical signal includes a first wavelength converter to convert the first optical signal from the first wavelength to the second wavelength before stabilization by the optical stabilizer.

3. The method of claim 1, wherein the first wavelength is in a range from 1260 nm to 1625 nm.

4. The method of claim 1, further comprising:

at the central node, producing a second optical signal at a third wavelength;

at the central node, directing the second optical signal into a first path for the second optical signal and a second path for the second optical signal, wherein the first path for the second optical signal is connected to a second optical stabilizer to stabilize the second optical signal produced by the central node, and the second path for the second optical signal provides the stabilized second optical signal to the optical network for distribution to each of the plurality of distributed nodes; and at each of the plurality of distributed nodes, converting the stabilized second optical signal from the third wavelength to a fourth wavelength; and at each of the plurality of distributed nodes, using the stabilized second optical signal at the fourth wavelength, wherein the third wavelength has a lower transmission loss than the fourth wavelength.

5. The method of claim 4, wherein the first path for the second optical signal includes a second wavelength converter to convert the second optical signal from the third wavelength to the fourth wavelength before stabilization by the second optical stabilizer.

6. The method of claim 4, wherein the third wavelength is 960 nm or 1248 nm.

7. The method of claim 5, wherein the first path for the second optical signal includes a mixer for mixing the second optical signal at the third wavelength with the first optical signal at the second wavelength following conversion of the first optical signal by the first wavelength converter.

8. The method of claim 1, wherein each of the plurality of distributed nodes utilize the stabilized first optical signal at the second wavelength to excite an electron of a Rydberg-atom from a first state to a second state.

9. The method of claim 8, wherein each of the plurality of distributed nodes utilize the stabilized second optical signal at the fourth wavelength to excite the electron of a Rydberg-atom from the second state to a third state.

10. The method of claim 8, wherein the Rydberg atom is part of a Rydberg-atom based Radio Frequency (RF) receiver.

11. The method of claim 1, wherein the optical network distributes the stabilized first optical signal on a hollow core fiber.

12. The method of claim 4, wherein the optical network distributes the stabilized second optical signal on a hollow core fiber.

13. A telecommunications network comprising:

a central node comprising:

a first optical source configured to produce a first optical signal at a first wavelength;

a first optical stabilizer configured to stabilize the first optical signal, a communications interface connectable to an optical network, and a first splitting unit configured to direct the first optical signal into a first path for the first optical signal and second path for the first optical signal, wherein the first path for the first optical signal is connected to the first optical stabilizer and the second path for the first optical signal is connected to the communications interface so as to provide the stabilized first optical signal to the optical network for distribution to each of the plurality of distributed nodes; and a plurality of distributed nodes configured to use the stabilized first optical signal at a second wavelength, each distributed node comprising:

a wavelength converter configured to convert the stabilized first optical signal from the first wavelength to the second wavelength, wherein the second wavelength has a lower transmission loss than the first wavelength.

14. The telecommunications network of claim 13, the central node further comprising a first wavelength converter configured to convert the first optical signal from the first wavelength to the second wavelength before stabilization by the first optical stabilizer.

15. The telecommunications network of claim 13, wherein the first wavelength is in a range from 1260 nm to 1625 nm.

16. The telecommunications network claim 13, wherein:

the central node further comprises:

a second optical source configured to produce a second optical signal at a third wavelength, a second optical stabilizer configured to stabilize the second optical signal, and a second splitting unit configured to direct the second optical signal into a first path for the second optical signal and second path for the second optical signal, wherein the first path for the second optical signal is connected to the second optical stabilizer and the second path for the second optical signal is connected to the communications interface so as to provide the stabilized second optical signal to the optical network for distribution to each of the plurality of distributed nodes; and each of the plurality of distributed nodes is configured to use the stabilized second optical signal at a fourth wavelength and further comprises:

a wavelength converter configured to convert the stabilized second optical signal from the third wavelength to the fourth wavelength, wherein the fourth wavelength has a lower transmission loss than the third wavelength.

17. The telecommunications network of claim 16, wherein the central node further comprises a second wavelength converter configured to convert the second optical signal from the third wavelength to the fourth wavelength before stabilization by the second optical stabilizer.

18. The telecommunications network of claim 16, wherein the third wavelength is in a range from 1260 nm to 1625 nm.

19. The telecommunications network of claim 14, wherein the second wavelength converter is configured to convert the stabilized second optical signal from the third wavelength to the fourth wavelength by mixing the stabilized second optical signal at the third wavelength with the stabilized first optical signal at the second wavelength following conversion of the first optical signal by the first wavelength converter.

20. The telecommunications network of claim 13, wherein each of the plurality of distributed nodes utilize the stabilized first optical signal at the second wavelength to excite an electron of a Rydberg-atom from a first state to a second state.

21. The telecommunications network of claim 16, wherein each of the plurality of distributed nodes utilize the stabilized second optical signal at the fourth wavelength to excite an electron of a Rydberg-atom from the second state to a third state.

22. The telecommunications network of claim 21, wherein the Rydberg atom is part of a Rydberg-atom based Radio Frequency (RF) receiver.

23. The telecommunications network of claim 20, wherein the optical network distributes the stabilized first optical signal on a hollow core fiber.

24. The telecommunications network of claim 20, wherein the optical network distributes the stabilized second optical signal on a hollow core fiber.

25. A non-transitory computer-readable storage medium storing a computer program comprising instructions to cause the device of claim 13 to execute the following in a telecommunications network, the telecommunications network including a central node, an optical network and a plurality of distributed nodes:

at the central node, producing a first optical signal at a first wavelength;

at the central node, directing the first optical signal into a first path for the first optical signal and a second path for the first optical signal, wherein the first path for the first optical signal is connected to a first optical stabilizer to stabilize the first optical signal produced by the central node, and the second path for the first optical signal provides the stabilized first optical signal to the optical network for distribution to each of the plurality of distributed nodes;

at each of the plurality of distributed nodes, converting the stabilized first optical signal from the first wavelength to a second wavelength; and at each of the plurality of distributed nodes, using the stabilized first optical signal at the second wavelength, wherein the first wavelength has a lower transmission loss than the second wavelength.

26. A system comprising:

at least one processor and memory configured to, in a telecommunications network including a central node, an optical network and a plurality of distributed nodes, cause:

at the central node, producing a first optical signal at a first wavelength;

at the central node, directing the first optical signal into a first path for the first optical signal and a second path for the first optical signal, wherein the first path for the first optical signal is connected to a first optical stabilizer to stabilize the first optical signal produced by the central node, and the second path for the first optical signal provides the stabilized first optical signal to the optical network for distribution to each of the plurality of distributed nodes;

at each of the plurality of distributed nodes, converting the stabilized first optical signal from the first wavelength to a second wavelength; and at each of the plurality of distributed nodes, using the stabilized first optical signal at the second wavelength, wherein the first wavelength has a lower transmission loss than the second wavelength.

* * * * *